United States Patent
Fan et al.

(10) Patent No.: US 7,565,369 B2
(45) Date of Patent: Jul. 21, 2009

(54) SYSTEM AND METHOD FOR MINING TIME-CHANGING DATA STREAMS

(75) Inventors: Wei Fan, New York, NY (US); Haixun Wang, Tarrytown, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 10/857,030

(22) Filed: May 28, 2004

(65) Prior Publication Data

US 2005/0278322 A1    Dec. 15, 2005

(51) Int. Cl.
*G06F 17/30* (2006.01)
(52) U.S. Cl. .................................. 707/102; 707/104.1
(58) Field of Classification Search ............ 707/1, 707/3, 5–7, 100, 102, 104.1, 200
See application file for complete search history.

(56) References Cited

U.S. PATENT DOCUMENTS

| | | | |
|---|---|---|---|
| 6,192,360 B1 * | 2/2001 | Dumais et al. | |
| 6,233,575 B1 * | 5/2001 | Agrawal et al. ................ | 707/6 |
| 6,751,600 B1 * | 6/2004 | Wolin ......................... | 706/12 |
| 6,820,089 B2 * | 11/2004 | Vishnubhotla .............. | 707/101 |
| 6,836,773 B2 * | 12/2004 | Tamayo et al. ................ | 707/6 |
| 6,941,303 B2 * | 9/2005 | Perrizo .......................... | 707/6 |
| 7,165,068 B2 * | 1/2007 | Dedhia et al. .................. | 707/7 |
| 2006/0004754 A1 * | 1/2006 | Aggarwal et al. ............. | 707/7 |
| 2006/0184527 A1 * | 8/2006 | Chi et al. ...................... | 707/7 |

OTHER PUBLICATIONS

Haixun wang et al., Mining Concept-Drifting Data Streams Using Ensemble Classifiers, Aug. 2003, ACM Press New-York, ISBN: 1-58113-737-O, pp. 226-235.*
Geoff Hulten et al., Mining time-changing data streams, 2001, ACM Press New-York, ISBN:1-58113-391-X, pp. 97-106.*
Pedro Domingos et al., Mining High-Speed Data Streams, ACM conference on Knowledge Discovery in Data, pp. 71-80.*
Aggarwal, C. C. A framework for diagnosing changes in evolving data streams, In Proceedings of ACM SIGMO 2003, pp. 575-586, 2003.
Babcock et al, Models and Issues in Data Stream Systems, In ACM Symposium on Principles of Database Systems (PODS), 2002.
Chen et al, Multi-dimensional regression analysis of time-series data streams, In Proceedings of Very Large Database (VLDB), Hong Kong, China, 2002.

(Continued)

*Primary Examiner*—Christian P. Chace
*Assistant Examiner*—Jacques Veillard
(74) *Attorney, Agent, or Firm*—Ference & Associates LLC

(57) ABSTRACT

A general framework for mining concept-drifting data streams using weighted ensemble classifiers. An ensemble of classification models, such as C4.5, RIPPER, naive Bayesian, etc., is trained from sequential chunks of the data stream. The classifiers in the ensemble are judiciously weighted based on their expected classification accuracy on the test data under the time-evolving environment. Thus, the ensemble approach improves both the efficiency in learning the model and the accuracy in performing classification. An empirical study shows that the proposed methods have substantial advantage over single-classifier approaches in prediction accuracy, and the ensemble framework is effective for a variety of classification models.

9 Claims, 11 Drawing Sheets

MODELS' CLASSIFICATION ERROR ON TEST SAMPLE Y

OTHER PUBLICATIONS

Domingos et al, Mining high-speed data streams, In International Conference of Knowledge Discovery and Data Mining (SIGKDD), pp. 71-80, Boston, MA 2000, ACM Press.

Gao et al, Continually evaluating similarity-based pattern, queries on a streaming time series, In International Conference Magnagement of Data (SIGMOD), Madison, WI, Jun. 2002.

Gehrke et al, Boat—Optimistic decision tree construction, In International Conference Management of Data (SIGMOD), 1999.

Greenwald et al, Space-efficient online computation of quantile summaries. In International Conference Management of Data (SIGMOD), pp. 58-66, Santa Barbara, CA, May 2001.

Guha et al, Clustering data streams, In IEEE Symposium on Foundations of Computer Science (FOCS), pp. 359-366, 2000.

Hulten et al., Mining Time-changing data streams, In International Conference on Knowledge Discovery and Data Mining (SIGKDD), pp. 97-106, San Franciasco, CA, 2001, ACM Press.

Stolfo et al, Credit card fraud detection using meta-learning: Issues and initial results, In AAAI-97 Workshop on Fraud Detection and Risk Management, 1997.

Street et al, A streaming ensemble algorithm (SEA) for large-scale classification, In International Conference on Knowledge Discovery and Data Mining (SIGKDD), 2001.

Wang et al, Mining concept-drifting data streams using ensemble classifiers, In Proceedings of ACM SIGKDD International Conference on Knwoledge Discovery and Data Mining (SIGKDD), 2003.

* cited by examiner

DATA DISTRIBUTIONS AND OPTIMUM BOUNDARIES

WHICH TRAINING DATASET TO USE?

MODELS' CLASSIFICATION ERROR ON TEST SAMPLE Y $E_k$ PRODUCES A SMALLER CLASSIFICATION ERROR THAN $G_k$, IF CLASSIFIERS IN $E_k$ ARE WEIGHTED BY THEIR EXPECTED CLASSIFICATION ACCURACY ON THE TEST DATA.

ERROR REGIONS ASSOCIATED WITH APPROXIMATING THE a posterioi PROBABILITIES

TRAINING TIME, CHUNK SIZE, AND ERROR RATE (A) REDUCTION OF ENSEMBLE SIZE BY INSTANCE-BASED PRUNING (B) BENEFIT IMPROVEMENT OF PRUNED ENSEMBLE FOR CREDIT CARD DATASET

EFFECTS OF INSTANCE-BASED PRUNING (A) VARYING WINDOW SIZE/ENSEMBLE SIZE (B) VARYING CHUNKSIZE

AVERAGE ERROR RATE OF SINGLE AND ENSEMBLE DECISION TREE CLASSIFIERS (A) NUMBER OF CHANGING DIMENSIONS (B) TOTAL DIMENSIONALITY

MAGNITUDE OF CONCEPT DRIFTS (C) (MONOTONIC) WEIGHT CHANGE PER DIMENSION

MAGNITUDE OF CONCEPT DRIFTS

AVERAGED BENEFITS USING SINGLE CLASSIFIERS AND CLASSIFIER ENSEMBLES (C) VARYING K
(SIMULATED STREAM)

(D) VARYING CHUNKSIZE
(SIMULATED STREAM)

AVERAGED BENEFITS USING SINGLE CLASSIFIERS
AND CLASSIFIER ENSEMBLES

SYSTEM AND METHOD FOR MINING TIME-CHANGING DATA STREAMS

FIELD OF THE INVENTION

The present invention generally relates to methods and arrangements for mining time-changing data streams.

BACKGROUND OF THE INVENTION

The scalability of data mining methods is constantly being challenged by real-time production systems that generate tremendous amount of data at unprecedented rates. Examples of such data streams include network event logs, telephone call records, credit card transactional flows, sensoring and surveillance video streams, etc. Other than the huge data volume, streaming data are also characterized by their drifting concepts. In other words, the underlying data generating mechanism, or the concept that we try to learn from the data, is constantly evolving. Knowledge discovery on streaming data is a research topic of growing interest. A need has accordingly been recognized in connection with solving the following problem: given an infinite amount of continuous measurements, how do we model them in order to capture time-evolving trends and patterns in the stream, and make time-critical predictions?

Huge data volume and drifting concepts are not unfamiliar to the data mining community. One of the goals of traditional data mining algorithms is to learn models from large databases with bounded-memory. It has been achieved by several classification methods, including Sprint, BOAT, etc. Nevertheless, the fact that these algorithms require multiple scans of the training data makes them inappropriate in the streaming environment where examples are coming in at a higher rate than they can be repeatedly analyzed.

Incremental or online data mining methods are another option for mining data streams. These methods continuously revise and refine a model by incorporating new data as they arrive. However, in order to guarantee that the model trained incrementally is identical to the model trained in the batch mode, most online algorithms rely on a costly model updating procedure, which sometimes makes the learning even slower than it is in batch mode. Recently, an efficient incremental decision tree algorithm called VFDT was introduced by Domingos et al. ("Mining High-Speed Data Streams", ACM SIG KDD, 2000).

For streams made up of discrete type of data, Hoeffding bounds guarantee that the output model of VFDT is asymptotically nearly identical to that of a batch learner.

The above mentioned algorithms, including incremental and online methods such as VFDT, all produce a single model that represents the entire data stream. It suffers in prediction accuracy in the presence of concept drifts. This is because the streaming data are not generated by a stationary stochastic process, indeed, the future examples we need to classify may have a very different distribution from the historical data.

Generally, in order to make time-critical predictions, the model learned from streaming data must be able to capture transient patterns in the stream. To do this, a need has been recognized in connection not only with revising a model by incorporating new examples, but also with eliminating the effects of examples representing outdated concepts. Accordingly, a need has been recognized in connection with addressing the challenges of maintaining an accurate and up-to-date classifier for infinite data streams with concept drifts, wherein the challenges include the following:

With regard to accuracy, it is difficult to decide what are the examples that represent outdated concepts, and hence their effects should be excluded from the model. A commonly used approach is to "forget" examples at a constant rate. However, a higher rate would lower the accuracy of the "up-to-date" model as it is supported by a less amount of training data and a lower rate would make the model less sensitive to the current trend and prevent it from discovering transient patterns.

With regard to efficiency, decision trees are constructed in a greedy divide-and-conquer manner, and they are non-stable. Even a slight drift of the underlying concepts may trigger substantial changes (e.g., replacing old branches with new branches, re-growing or building alternative sub-branches) in the tree, and severely compromise learning efficiency.

With regard to ease of use, substantial implementation efforts are required to adapt classification methods such as decision trees to handle data streams with drifting concepts in an incremental manner. The usability of this approach is limited as state-of-the-art learning methods cannot be applied directly.

SUMMARY OF THE INVENTION

In light of the challenges just mentioned, there is broadly contemplated herein, in accordance with at least one presently preferred embodiment of the present invention, the use of weighted classifier ensembles to mine streaming data with concept drifts. Instead of continuously revising a single model, an ensemble of classifiers is preferably trained from sequential data chunks in the stream. Maintaining a most up-to-date classifier is not necessarily the ideal choice, because potentially valuable information may be wasted by discarding results of previously-trained less-accurate classifiers. It is thereby shown that, in order to avoid overfitting and the problems of conflicting concepts, the expiration of old data must rely on data's distribution instead of only their arrival time. The ensemble approach offers this capability by giving each classifier a weight based on its expected prediction accuracy on the current test examples. Another benefit of the ensemble approach is its efficiency and ease-of-use.

Herein, there are also considered issues in cost-sensitive learning, and present an instance-based ensemble pruning method that shows in a cost-sensitive scenario a pruned ensemble delivers the same level of benefits as the entire set of classifiers.

In summary, one aspect of the invention provides an apparatus for mining concept-drifting data streams, said apparatus comprising: an arrangement for accepting an ensemble of classifiers; an arrangement for training the ensemble of classifiers from data in a data stream; and an arrangement for weighting classifiers in the classifier ensembles.

Another aspect of the invention provides a method for mining concept-drifting data streams, said method comprising the steps of: accepting an ensemble of classifiers; training the ensemble of classifiers from data in a data stream; and weighting classifiers in the classifier ensembles.

Furthermore, an additional aspect of the invention provides a program storage device readable by machine, tangibly embodying a program of instructions executable by the machine to perform method steps for mining concept-drifting data streams, said method comprising the steps of: accepting an ensemble of classifiers; training the ensemble of classifiers from data in a data stream; and weighting classifiers in the classifier ensembles.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

There follows herebelow a discussion of data expiration problems in mining concept-drifting data streams, then a discussion of the error reduction property of classifier ensembles in the presence of concept drifts. The disclosure then turns to a discussion of an algorithm framework for solving the problem, followed by that of a method that permits a great reduction in the number of classifiers in an ensemble with little loss. Experimentation and related work is then discussed.

A fundamental problem in learning drifting concepts is how to identify in a timely manner those data in the training set that are no longer consistent with the current concepts. These data must be discarded. A straightforward solution, which is used in many current approaches, discards data indiscriminately after they become old, that is, after a fixed period of time T has passed since their arrival. Although this solution is conceptually simple, it tends to complicate the logic of the learning algorithm. More importantly, it creates the following dilemma which makes it vulnerable to unpredictable conceptual changes in the data: if T is large, the training set is likely to contain outdated concepts, which reduces classification accuracy; if T is small, the training set may not have enough data, and as a result, the learned model will likely carry a large variance due to overfitting.

Figure 1:
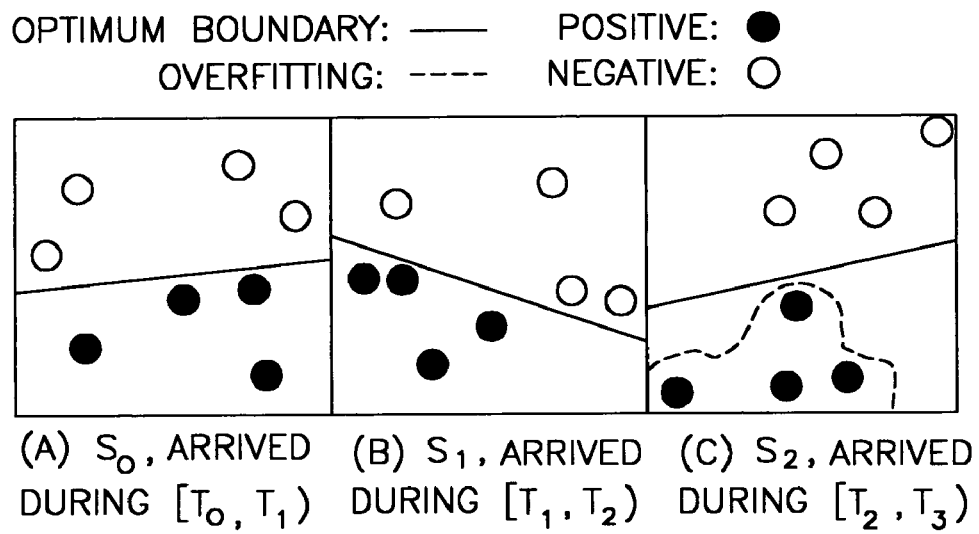
FIG. 1 shows data distribution and optimum boundaries.

We use a simple example to illustrate the problem. Assume a stream of 2-dimensional data is partitioned into sequential chunks based on their arrival time. Let $S_i$ be the data that came in between time $t_i$ and $t_{i+1}$. FIG. 1 shows the distribution of the data and the optimum decision boundary during each time interval.

The problem is: after the arrival of $S_2$ at time $t_3$, what part of the training data should still remain influential in the current model so that the data arriving after $t_3$ can be most accurately classified?

On one hand, in order to reduce the influence of old data that may represent a different concept, we shall use nothing but the most recent data in the stream as the training set. For instance, use the training set consisting of $S_2$ only (i.e., $T=t_3-t_2$, data $S_1$, $S_0$ are discarded). However, as shown in FIG. 1(c), the learned model may carry a significant variance since $S_2$'s insufficient amount of data are very likely to be overfitted.

Figure 2:
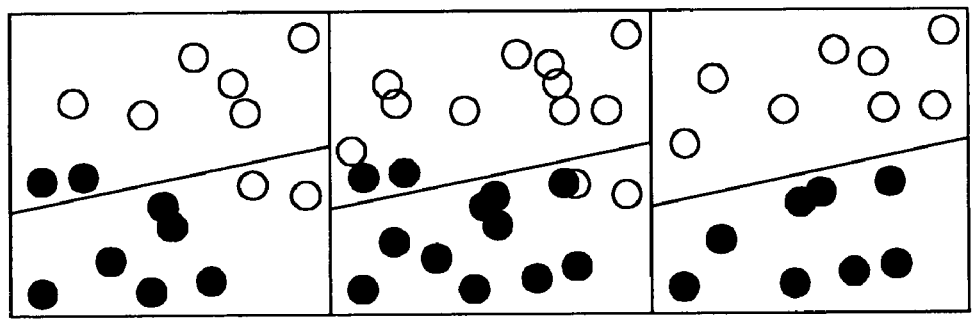
FIG. 2 shows optimum boundaries for various training datasets.

The inclusion of more historical data in training, on the other hand, may also reduce classification accuracy. In FIG. 2(a), where $S_2 \cup S_1$ (i.e., $T=t_3-t_1$) is used as the training set, we can see that the discrepancy between the underlying concepts of $S_1$ and S becomes the cause of the problem. Using a training set consisting of $S_2 \cup S_1 \cup S_0$ (i.e., $T=t_3-t_0$) will not solve the problem either. Thus, there may not exists an optimum T to avoid problems arising from overfitting and conflicting concepts.

We should not discard data that may still provide useful information to classify the current test examples. FIG. 2(c) shows that the combination of $S_2$ and $S_0$ creates a classifier with less overfitting or conflicting-concept concerns. The reason is that $S_2$ and $S_0$ have similar class distribution. Thus, instead of discarding data using the criteria based solely on their arrival time, we shall make decisions based on their class distribution. Historical data whose class distributions are similar to that of current data can reduce the variance of the current model and increase classification accuracy.

However, it is a non-trivial task to select training examples based on their class distribution. Herebelow, there is discussed, in accordance with at least one presently preferred embodiment of the present invention, the manner via which a weighted classifier ensemble can enable one to achieve this goal. It is first proven that a carefully weighted classifier ensemble built on a set of data partitions $S_1, S_2, \ldots, S_n$ is more accurate than a single classifier built on $S_1 \cup S_2 \cup \ldots \cup S_n$. Then, it is discussed how the classifiers are weighted.

Given a test example y, a classifier outputs $f_c(y)$, the probability of y being an instance of class c. A classifier ensemble pools the outputs of several classifiers before a decision is made. The most popular way of combining multiple classifiers is via averaging, in which case the probability output of the ensemble is given by:

$$f_c^E(y) = \frac{1}{k}\sum_{i=1}^{k} f_c^i(y)$$

where $f_c^i(y)$ is the probability output of the i-th classifier in the ensemble.

The outputs of a well trained classifier are expected to approximate the a posterior class distribution. In addition to the Bayes error, the remaining error of the classifier can be decomposed into bias and variance. More specifically, given a test example y, the probability output of classifier $C_i$ can be expressed as:

$$f_c^i(y) = p(c|y) + \beta_c^i + \eta_c^i(y) \qquad (1)$$

added error for y where $p(c|y)$ is the a posterior probability distribution of class c given input y, $\beta_c^i$ is the bias of $C_i$, and $\eta_c^i(y)$ is the variance of $C_i$ given input y. In the following discussion, we assume the error consists of variance only, as our major goal is to reduce the error caused by the discrepancies among the classifiers trained on different data chunks.

Assume an incoming data stream is partitioned into sequential chunks of fixed size, $S_1, S_2, \ldots, S_n$, with $S_n$ being the most recent chunk. Let $C_i$, $G_k$, and $E_k$ denote the following models.

$C_i$: classifier learned from training set $S_i$;

$G_k$: classifier learned from the training set consisting of the last k chunks $S_{n-k+1} \cup \ldots \cup S_n$;

$E_k$: classifier ensemble consisting of the last k classifiers $C_{n-k+1}, \ldots, C_n$.

Figure 3:
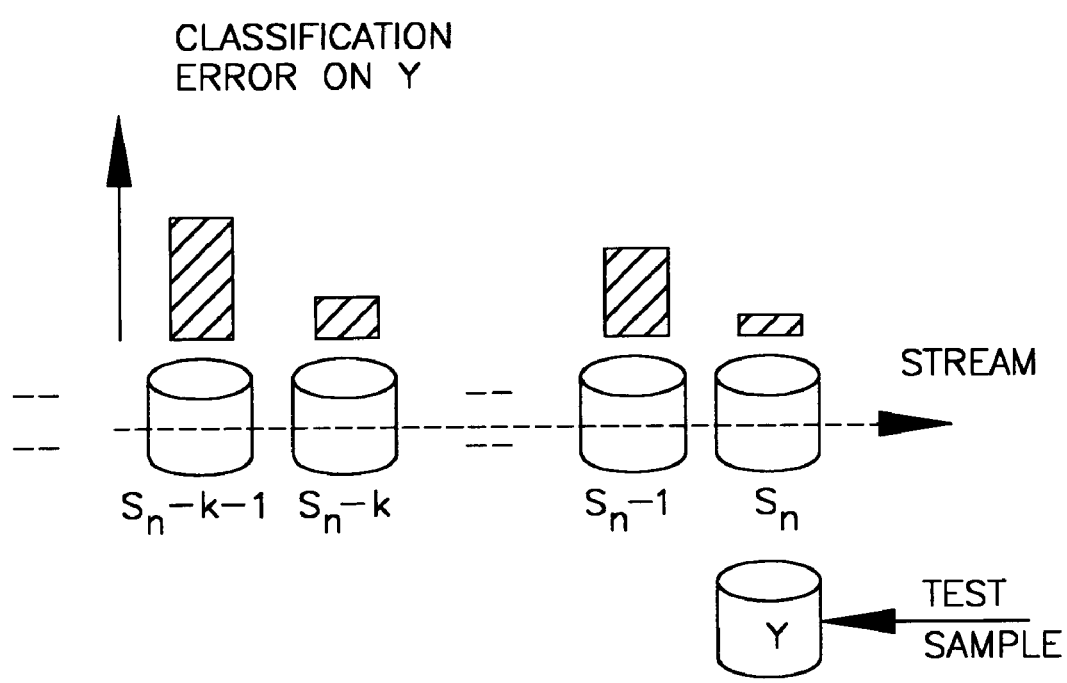
FIG. 3 shows model classification errors on a test sample.

In the concept-drifting environment, models learned upstream may carry significant variances when they are applied to the current test cases (FIG. 3). Thus, instead of averaging the outputs of classifiers in the ensemble, we use the weighted approach. We assign each classifier $C_i$ a weight $w_i$, such that $w_i$ is inversely proportional to $C_i$'s expected error (when applied to the current test cases). Hereinbelow, there is introduced a method of generating such weights based on estimated classification errors. Here, assuming each classifier is so weighted, we prove the following property.

$E_k$ produces a smaller classification error than $G_k$, if classifiers in $E_k$ are weighted by their expected classification accuracy on the test data.

Figure 4:
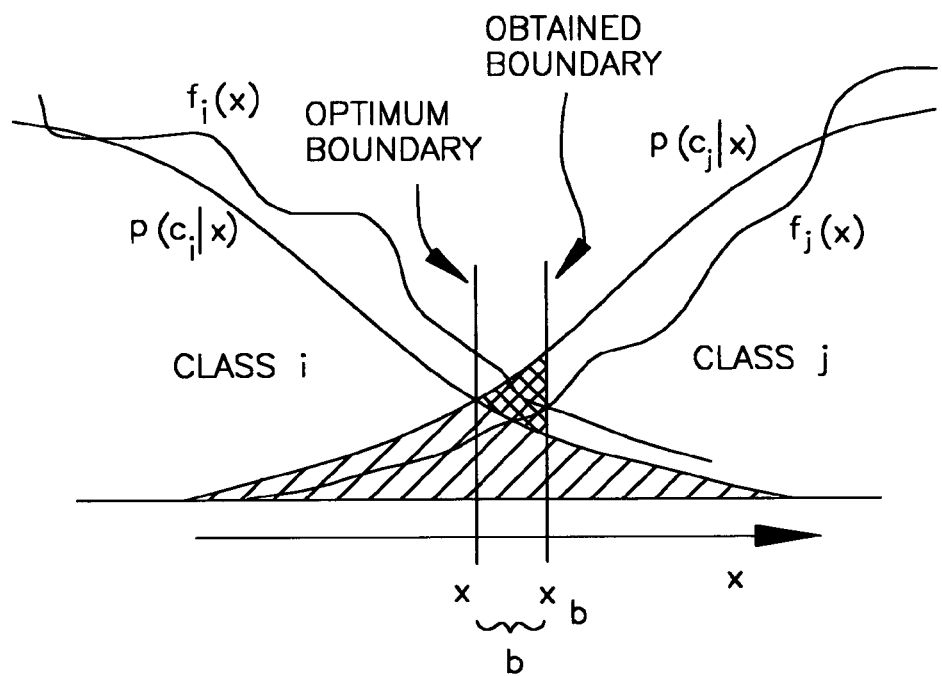
FIG. 4 shows error regions associated with approximating the a posteriori probabilities.

We prove this property through bias-variance decomposition based on Tumer's work. The Bayes optimum decision assigns x to class i if $p(c_i|x) > p(c_k|x), \forall k \neq i$. Therefore, as shown in FIG. 4, the Bayes optimum boundary is the loci of all points $x^*$ such that $p(c_i|x^*) = p(c_j|x^*)$, where $j = \mathrm{argmax}_k p(c_k|x^*)$. The decision boundary of our classifier may vary from the optimum boundary. In FIG. 4, $b = x_b - x^*$ denotes the amount by which the boundary of the classifier differs from the optimum boundary. In other words, patterns corresponding to the darkly shaded region are erroneously classified by the classifier. The classifier thus introduces an expected error Err in addition to the error of the Bayes optimum decision:

$$\mathrm{Err} = \int_{-\infty}^{\infty} A(b) f_b(b) db$$

where $A(b)$ is the area of the darkly shaded region, and $f_b$ is the density function for b. Turner et al proves that the expected added error can be expressed by:

$$\mathrm{Err} = \frac{\sigma_{\eta_c}^2}{s} \quad (2)$$

where $s = p'(c_j|x^*) - p'(c_i|x^*)$ is independent of the trained model[1], and $\sigma_{\eta_c}^2$ denotes the variances of $\eta_c(x)$.

Thus, given a test example y, the probability output of the single classifier $G_k$ can be expressed as:

$$f_c^g(y) = p(c|y) + \eta_c^g(y)$$

Assuming each partition $S_i$ is of the same size, we study $\sigma_{\eta_c^g}^2$, the variance of $\eta_c^g(y)$. If each $S_i$ has identical class distribution, that is, there is no conceptual drift, then the single classifier $G_k$, which is learned from k partitions, can reduce the average variance by a factor of k. With the presence of conceptual drifts, we have:

$$\sigma_{\eta_c^g}^2 \geq \frac{1}{k^2} \sum_{i=n-k+1}^{n} \sigma_{\eta_c^i}^2 \quad (3)$$

For the ensemble approach, we use weighted averaging to combine outputs of the classifiers in the ensemble. The probability output of the ensemble is given by:

$$f_c^E(y) = \sum_{i=n-k+1}^{n} \omega_i f_c^i(y) \bigg/ \sum_{i=n-k+1}^{n} \omega_i \quad (4)$$

where $\omega_i$ is the weight of the i-th classifier, which is assumed to be inversely proportional to $\mathrm{Err}_i$ (c is a constant):

$$\omega_i = \frac{c}{\sigma_{\eta_c^i}^2} \quad (5)$$

The probability output $E_k$ (4) can also be expressed as:

$$f_c^E(y) = p(c|y) + \eta_c^E(y)$$

where $$\eta_c^E(y) = \sum_{i=n-k+1}^{n} \omega_i \eta_c^i(y) \bigg/ \sum_{i=n-k+1}^{n} \omega_i$$

Assuming the variances of different classifiers are independent, we derive the variance of $\eta_c^E(y)$:

$$\sigma_{\eta_c^E}^2 = \sum_{i=n-k+1}^{n} \omega_i^2 \sigma_{\eta_c^i}^2 \bigg/ \left( \sum_{i=n-k+1}^{n} \omega_i \right)^2 \quad (6)$$

We use the reverse proportional assumption of (5) to simplify (6) to the following:

$$\sigma_{\eta_c^E}^2 = 1 \bigg/ \sum_{i=n-k+1}^{n} \frac{1}{\sigma_{\eta_c^i}^2}$$

It is easy to prove:

$$\sum_{i=n-k+1}^{n} \sigma_{\eta_c^i}^2 \sum_{i=n-k+1}^{n} \frac{1}{\sigma_{\eta_c^i}^2} \geq k^2$$

or equivalently:

$$1 \bigg/ \sum_{i=n-k+1}^{n} \frac{1}{\sigma_{\eta_c^i}^2} \leq \frac{1}{k^2} \sum_{i=n-k+1}^{n} \sigma_{\eta_c^i}^2$$

which based on (3) and (7) means:

$$\sigma_{\eta_c^E}^2 \leq \sigma_{\eta_c^g}^2$$

and thus, we have proved:

$$\mathrm{Err}^E \leq \mathrm{Err}^G$$

This means, compared with the single classifier $G_k$, which is learned from the examples in the entire window of k chunks, the classifier ensemble approach is capable of reducing classification error through a weighting scheme where a classifier's weight is inversely proportional to its expected error.

Note that the above property does not guarantee that $E_k$ has higher accuracy than classifier $G_j$ if $j < k$. For instance, if the concept drifts between the partitions are so dramatic that $S_{n-1}$ and $S_n$ represent totally conflicting concepts, then adding $C_{n-1}$ in decision making will only raise classification error. A weighting scheme should assign classifiers representing totally conflicting concepts near-zero weights. We discuss how to tune weights in detail herebelow.

The proof of the error reduction property hereabove showed that a classifier ensemble can outperform a single classifier in the presence of concept drifts. To apply it to real-world problems we need to assign an actual weight to each classifier that reflects its predictive accuracy on the current testing data.

The incoming data stream is partitioned into sequential chunks, $S_1, S_2, \ldots, S_n$, with $S_n$ being the most up-to-date chunk, and each chunk is of the same size, or ChunkSize. We learn a classifier C for each $S_i, i \geq 1$.

According to the error reduction property, given test examples T, we should give each classifier $C_i$ a weight inversely proportional to the expected error of $C_i$ in classifying T. To do this, we need to know the actual function being learned, which is unavailable.

We derive the weight of classifier $C_i$ by estimating its expected prediction error on the test examples. We assume the class distribution of $S_n$, the most recent training data, is closest to the class distribution of the current test data. Thus, the weights of the classifiers can be approximated by computing their classification error on $S_n$.

More specifically, assume that $S_n$ consists of records in the form of (x, c), where c is the true label of the record. $C_i$'s classification error of example (x, c) is $1-f_c^i(x)$, where $f_c^i(x)$ is the probability given by $C_i$ that x is an instance of class c. Thus, the mean square error of classifier $C_i$ can be expressed by:

$$MSE_i = \frac{1}{|S_n|} \sum_{(x,c) \in S_n} (1 - f_c^i(x))^2$$

The weight of classifier $C_i$ should be inversely proportional to $MSE_i$. On the other hand, a classifier predicts randomly (that is, the probability of x being classified as class c equals to c's class distributions p(c)) will have mean square error:

$$MSE_r = \sum_c p(c)(1 - p(c))^2$$

For instance, if $C \in \{0,1\}$ and the class distribution is uniform, we have $MSE_r = 25$. Since a random model does not contain useful knowledge about the data, we use $MSE_r$, the error rate of the random classifier as a threshold in weighting the classifiers. That is, we discard classifiers whose error is equal to or larger than $MSE_r$. Furthermore, to make computation easy, we use the following weight $w_i$ for $C_i$:

$$w_i = MSE_r - MSE_i \qquad (8)$$

For cost-sensitive applications such as credit card fraud detection, we use the benefits (e.g., total fraud amount detected) achieved by classifier $C_i$ on the most recent training data $S_n$ as its weight.

Assume the benefit of classifying transaction x of actual class c as a case of class c' is $b_{cc'}(x)$. Based on the benefit matrix shown in Table 1 (all tables appear in the Appendix hereto) (where t(x) is the transaction amount, and cost is the fraud investigation cost), the total benefits achieved by $C_i$ is:

$$b_i = \sum_{(x,c) \in S_n} \sum_{c'} b_{cc'}(x) \cdot f_{c'}^i(x)$$

and we assign the following weight to $C_i$:

$$w_i = b_i - b_r$$

where $b_r$ is the benefits achieved by a classifier that predicts randomly. Also, we discard classifiers with 0 or negative weights.

Since we are essentially handling infinite incoming data flows, we will learn an infinite number of classifiers over the time. It is essentially impossible and unnecessary to keep and use all the classifiers for prediction. Instead, we only keep the top K classifiers with the highest prediction accuracy on the current training data. Herebelow, there is discussed ensemble pruning in more detail and present a technique for instance-based pruning.

Algorithm 1 (all algorithms appear in the Appendix hereto) gives an outline of the classifier ensemble approach for mining concept-drifting data streams. Whenever a new chunk of data has arrived, we build a classifier from the data, and use the data to tune the weights of the previous classifiers. Usually, ChunkSize is small (our experiments use chunks of size ranging from 1,000 to 25,000 records), and the entire chunk can be held in memory with ease.

The algorithm for classification is straightforward, and it is omitted here. Basically, given a test case y, each of the K classifiers is applied on y, and their outputs are combined through weighted averaging.

Assume the complexity for building a classifier on a data set of size s is $f(s)$. The complexity to classify a test data set in order to tune its weight is linear in the size of the test data set. Suppose the entire data stream is divided into a set of n partitions, then the complexity of Algorithm 1 is $O(n \cdot f(s/n) + Ks)$, where $n \gg K$. On the other hand, building a single classifier on s requires $O(f(s))$. For most classifier algorithms, $f(\cdot)$ is super-linear, which means the ensemble approach is more efficient.

The disclosure now turns to the topic of ensemble pruning. A classifier ensemble combines the probability or the benefit output of a set of classifiers. Given a test example y, we need to consult every classifier in the ensemble, which is often time consuming in an online streaming environment.

By way of overview, in many applications, the combined result of the classifiers usually converges to the final value well before all classifiers are consulted. The goal of pruning is to identify a subset of classifiers that achieves the same level of total benefits as the entire ensemble.

Traditional pruning is based on classifiers' overall performances (e.g., average error rate, average benefits, etc.). Several criteria can be used in pruning. The first criterion is mean square error. The goal is to find a set of n classifiers that has the minimum mean square error. The second approach favors classifier diversity, as diversity is the major factor in error reduction. KL-distance, or relative entropy, is a widely used measure for difference between two distributions. The KL-distance between two distributions p and q is defined as $D(p \| q) = \Sigma_x p(x) \log p(x)/q(x)$. In our case, p and q are the class distributions given by two classifiers. The goal is then to find the set of classifiers S that maximizes mutual KL-distances.

It is, however, impractical to search for the optimal set of classifiers based on the MSE criterion or the KL-distance criterion. Even greedy methods are time consuming: the complexities of the greedy methods of the two approaches are $O(|T| \cdot N \cdot K)$ and $O(|T| \cdot N \cdot K^2)$ respectively, where N is the total number of available classifiers.

Besides the complexity issue, the above two approaches do not apply to cost-sensitive applications. Moreover, the applicability of the KL-distance criterion is limited to streams with no or mild concept drifting only, since concept drifts also enlarge the KL-distance.

In accordance with at least one presently preferred embodiment of the present invention, it is broadly contemplated that the instance-based pruning technique be applied to data streams with conceptual drifts.

In this connection, cost-sensitive applications usually provide higher error tolerance. For instance, in credit card fraud detection, the decision threshold of whether to launch an investigation or not is:

$$p(\text{fraud}|y) \cdot t(y) > \text{cost}$$

where t(y) is the amount of transaction y. In other words, as long as p(fraud|y)>cost/t(y), transaction y will be classified as fraud no matter what the exact value of p(fraud|y) is. For example, assuming t(y)=$900, cost=$90, both p(fraud|y)=0.2 and p(fraud|y)=0.4 result in the same prediction. This property helps reduce the "expected" number of classifiers needed in prediction.

We preferably use the following approach for instance based ensemble pruning. For a given ensemble S consisting of K classifiers, we first order the K classifiers by their decreasing weight into a "pipeline". (The weights are tuned for the most-recent training set.) To classify a test example y, the classifier with the highest weight is consulted first, followed by other classifiers in the pipeline. This pipeline procedure stops as soon as a "confident prediction" can be made or there are no more classifiers in the pipeline.

More specifically, assume that $C_1, \ldots, C_K$ are the classifiers in the pipeline, with C1 having the highest weight. After consulting the first k classifiers $C_1, \ldots, C_k$, we derive the current weighted probability as:

$$F_k(x) = \frac{\sum_{i=1}^{k} w_i \cdot p_i(\text{fraud} \mid x)}{\sum_{i=1}^{k} w_i}$$

The final weighted probability, derived after all K classifiers are consulted, is $F_K(x)$. Let $\epsilon_k(x) = F_k(x) - F_K(x)$ be the error at stage k. The question is, if we ignore $\epsilon_k(x)$ and use $F_k(x)$ to decide whether to launch a fraud investigation or not, how much confidence do we have that using $F_K(x)$ would have reached the same decision?

Algorithm 2 estimates the confidence. We compute the mean and the variance of $\epsilon_k(x)$, assuming that $\epsilon_k(x)$ follows normal distribution. The mean and variance statistics can be obtained by evaluating $F_k(\cdot)$ on the current training set for every classifier $C_k$. To reduce the possible error range, we study the distribution under a finer grain. We divide [0, 1], the range of $F_k(\cdot)$, into $\xi$ bins. An example x is put into bin i if $$F_k(x) \in \left[\frac{i}{\xi}, \frac{i+1}{\xi}\right).$$

We then compute $\mu_{k,i}$ and $\sigma_{k,i}^2$, the mean and the variance of the error of those training examples in bin i at stage k.

Algorithm 3 outlines the procedure of classifying an unknown instance y. We use the following decision rules after we have applied the first k classifiers in the pipeline on instance y:

$$\begin{cases} F_k(y) - \mu_{k,i} - t \cdot \sigma_{k,i} > \text{cost}/t(y), & \text{fraud} \\ F_k(y) - \mu_{k,i} + t \cdot \sigma_{k,i} \leq \text{cost}/t(y), & \text{non-fraud} \\ \text{otherwise,} & \text{uncertain} \end{cases} \quad (10)$$

where i is the bin y belongs to, and t is a confidence interval parameter. Under the assumption of normal distribution, t=3 delivers a confidence of 99.7%, and t=2 of 95%. When the prediction is uncertain, that is, the instance falls out of the t sigma region, the next classifier in the pipeline, $C_k+1$, is employed, and the rules are applied again. If there are no classifiers left in the pipeline, the current prediction is returned. As a result, an example does not need to use all classifiers in the pipeline to compute a confident prediction. The "expected" number of classifiers can be reduced.

Algorithm 3 outlines instance based pruning. To classify a dataset of size s, the worst case complexity is O(Ks). In the experiments, we show that the actual number of classifiers can be reduced dramatically without affecting the classification performance.

The cost of instance based pruning mainly comes from updating $\mu_{k,i}$ and $\sigma_{k,i}^2$ for each k and i. These statistics are obtained during training time. The procedure shown in Algorithm 2 is an improved version of Algorithm 1. The complexity of Algorithm 2 remains $O(n \cdot f(s/n) + Ks)$ (updating of the statistics costs O(Ks)), where s is the size of the data stream, and n is the number of partitions of the data stream.

Extensive experimentation was conducted on both synthetic and real life data streams. Among the goals were the demonstration of the error reduction effects of weighted classifier ensembles, the evaluation of the impact of the frequency and magnitude of the concept drifts on prediction accuracy, and the analysis of advantage of approaches contemplated herein over alternative methods such as incremental learning. The base models used in the tests were C4.5, the RIPPER rule learner, and the Naive Bayesian method. (These models are discussed in the following publications: for C45, J. Ross Quinlan, "C4.5: Programs for machine learning", Morgan Kaufmann, 1993; for RIPPER, William Cohen, "Fast Effective Rule Induction", Int'l Conf. on Machine Learning (ICML), 1995; and for Naïve Bayesian, Tom M. Mitchell, "Machine Learning", McGraw Hill, 1997). The tests were conducted on a Linux machine with a 770 MHz CPU and 256 MB main memory.

We denote a classifier ensemble with a capacity of K classifiers as $E_K$. Each classifier is trained by a data set of size ChunkSize. We compare with algorithms that rely on a single classifier for mining streaming data. We assume the classifier is continuously being revised by the data that have just arrived and the data being faded out. We call it a window classifier, since only the data in the most recent window have influence on the model. We denote such a classifier by $G_K$, where K is the number of data chunks in the window, and the total number of the records in the window is K·ChunkSize. Thus, ensemble $E_K$ and $G_K$ are trained from the same amount of data. Particularly, we have $E_1 = G_1$. We also use $G_0$ to denote the classifier built on the entire historical data starting from the beginning of the data stream up to now. For instance, BOAT and VFDT are $G_0$ classifiers, while CVFDT is a $G_K$ classifier.

We create synthetic data with drifting concepts based on a moving hyperplane. A hyperplane in d-dimensional space is denoted by equation:

$$\sum_{i=1}^{d} a_i x_i = a_0 \quad (11)$$

We label examples satisfying $\sum_{i=1}^{d} a_i x_i < a_0$ as positive, and examples satisfying $\sum_{i=1}^{d} a_i x_i < a_0$ as negative. Hyperplanes have been used to simulate time-changing concepts because the orientation and the position of the hyperplane can be changed in a smooth manner by changing the magnitude of the weights.

We generate random examples uniformly distributed in multidimensional space $[0,1]^d$. Weights $a_i (1 \le i \le d)$ in (11) are initialized randomly in the range of [0, 1]. We choose the value of $a_0$ so that the hyperplane cuts the multi-dimensional space in two parts of the same volume, that is, $$a_0 = \frac{1}{2} \sum_{i=1}^{d} a_i.$$

Thus, roughly half of the examples are positive, and the other half negative. Noise is introduced by randomly switching the labels of p% of the examples. In our experiments, the noise level p% is set to 5%.

We simulate concept drifts by a series of parameters. Parameter k specifies the total number of dimensions whose weights are changing. Parameter $t \in R$ specifies the magnitude of the change (every N examples) for weights $a_1, \ldots a_k$, and $s_i \in \{-1, 1\}$ specifies the direction of change for each weight $a_i, 1 \le i \le k$. Weights change continuously, i.e., $a_i$ is adjusted by $s_i \cdot t/N$ after each example is generated. Furthermore, there is a possibility of 10% that the change would reverse direction after every N examples are generated, that is, $s_i$ is replaced by $-s_i$ with probability 10%. Also, each time the weights are updated, we recompute $$a_0 = \frac{1}{2} \sum_{i=1}^{d} a_i$$

so that the class distribution is not disturbed.

For credit card fraud data, we use real life credit card transaction flows for cost-sensitive mining. The data set is sampled from credit card transaction records within a one year period and contains a total of 5 million transactions. Features of the data include the time of the transaction, the merchant type, the merchant location, past payments, the summary of transaction history, etc. A detailed description of this data set can be found in. We use the benefit matrix shown in Table 1 with the cost of disputing and investigating a fraud transaction fixed at cost=$90.

The total benefit is the sum of recovered amount of fraudulent transactions less the investigation cost. To study the impact of concept drifts on the benefits, we derive two streams from the dataset. Records in the 1st stream are ordered by transaction time, and records in the 2nd stream by transaction amount.

Figure 5:
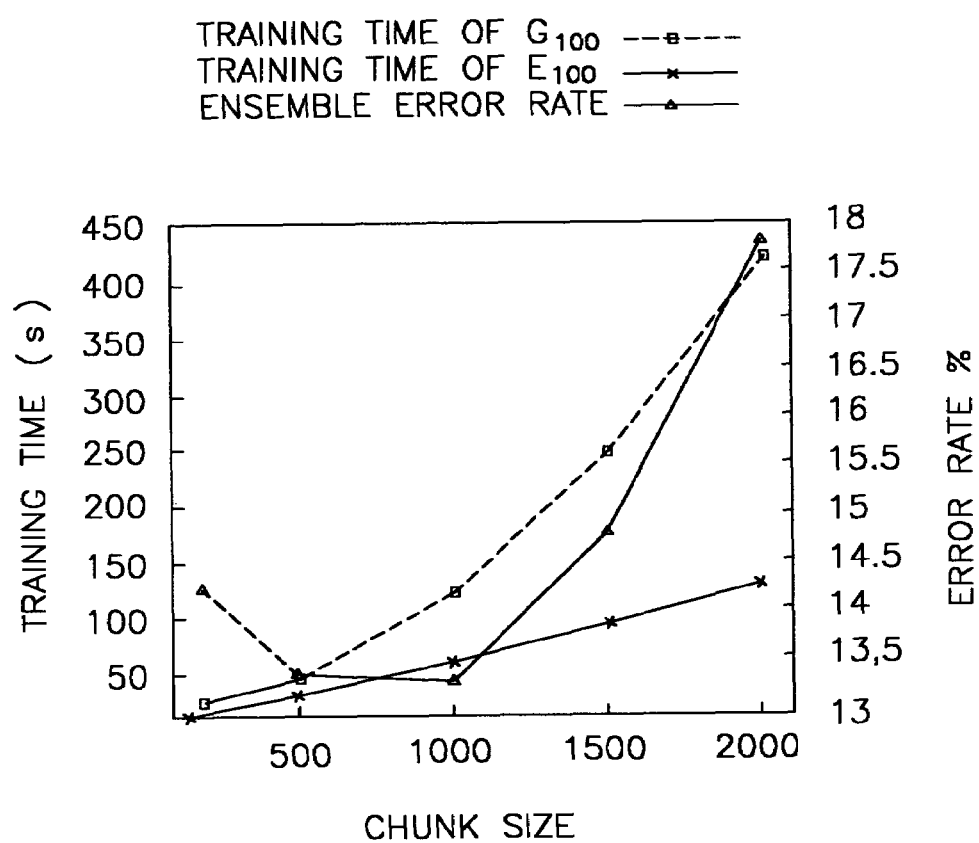
FIG. 5 shows training time, ChunkSize, and error rate.

By way of experimental results, we study the time complexity of the ensemble approach. We generate synthetic data streams and train single decision tree classifiers and ensembles with varied ChunkSize. Consider a window of K=100 chunks in the data stream. FIG. 5 shows that the ensemble approach $E_K$ is much more efficient than the corresponding single-classifier $G_K$ in training.

Smaller ChunkSize offers better training performance. However, ChunkSize also affects classification error. FIG. 5 shows the relationship between error rate (of $E_{10}$, e.g.) and ChunkSize. The dataset is generated with certain concept drifts (weights of 20% of the dimensions change t=0.1 per N=1000 records), large chunks produce higher error rates because the ensemble cannot detect the concept drifts occurring inside the chunk. Small chunks can also drive up error rates if the number of classifiers in an ensemble is not large enough. This is because when ChunkSize is small, each individual classifier in the ensemble is not supported by enough amount of training data.

Figure 6:
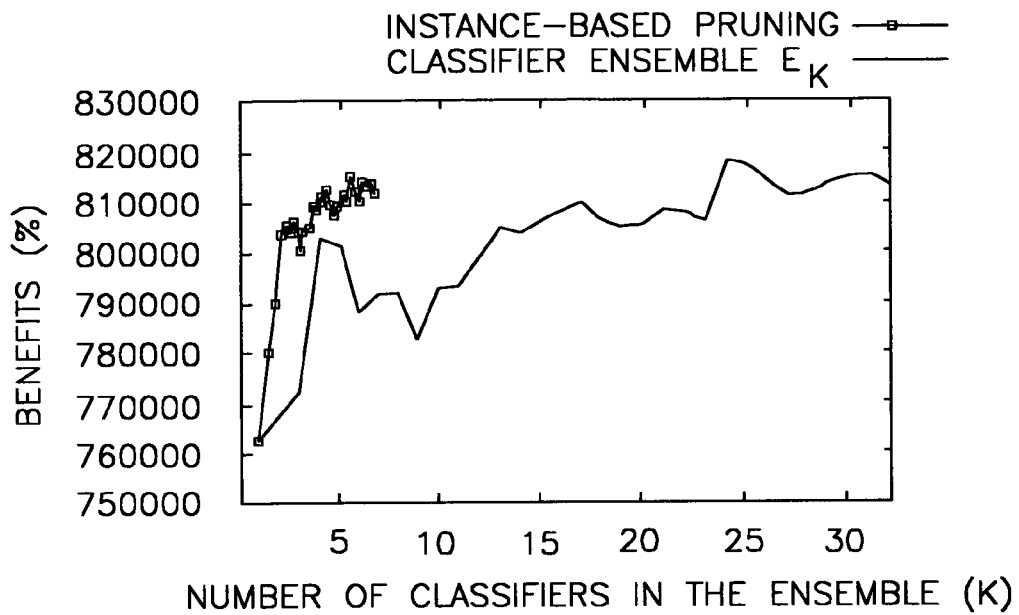
FIGS. 6(a) and 6(b) show effects of instance-based pruning.
Figure 6:
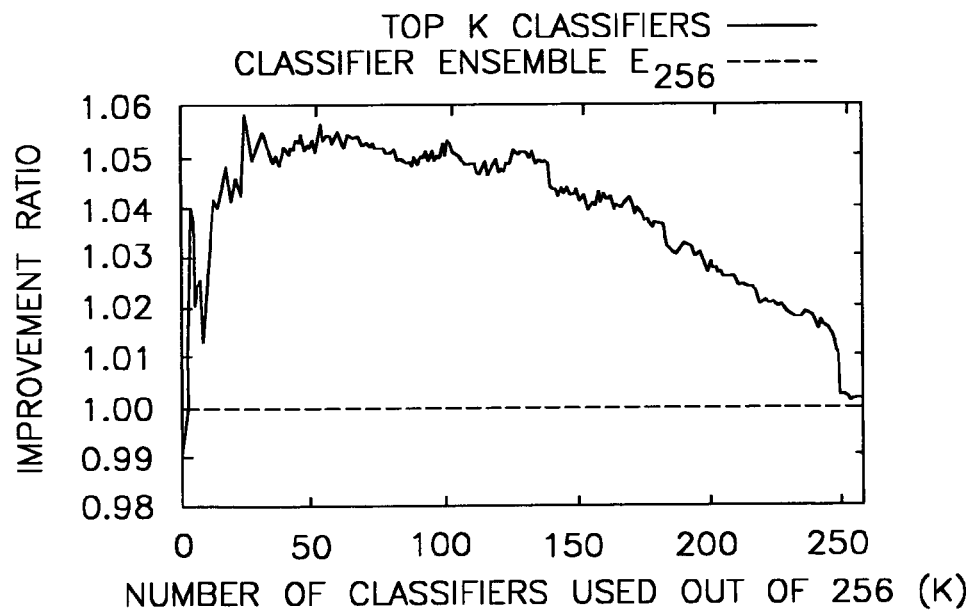

Pruning improves classification efficiency. We examine the effects of instance based pruning using the credit card fraud data. In FIG. 6(a), we show the total benefits achieved by ensemble classifiers with and without instance-based pruning. The X-axis represents the number of the classifiers in the ensemble, K, which ranges from 1 to 32. When instance-based pruning is in effect, the actual number of classifiers to be consulted is reduced. In the figure, we overload the meaning of the X-axis to represent the average number of classifiers used under instance-based pruning. For $E_{32}$, pruning reduces the average number of classifiers to 6.79, a reduction of 79%. Still, it achieves a benefit of $811,838, which is just a 0.1% drop from $812,732—the benefit achieved by $E_{32}$ which uses all 32 classifiers.

FIG. 6(b) studies the same phenomena using 256 classifiers (K=256). Instead of dynamic pruning, we use the top K classifiers, and the Y-axis shows the benefits improvement ratio. The top ranked classifiers in the pipeline outperform $E_{256}$ in almost all the cases except if only the 1st classifier in the pipeline is used.

Figure 7:
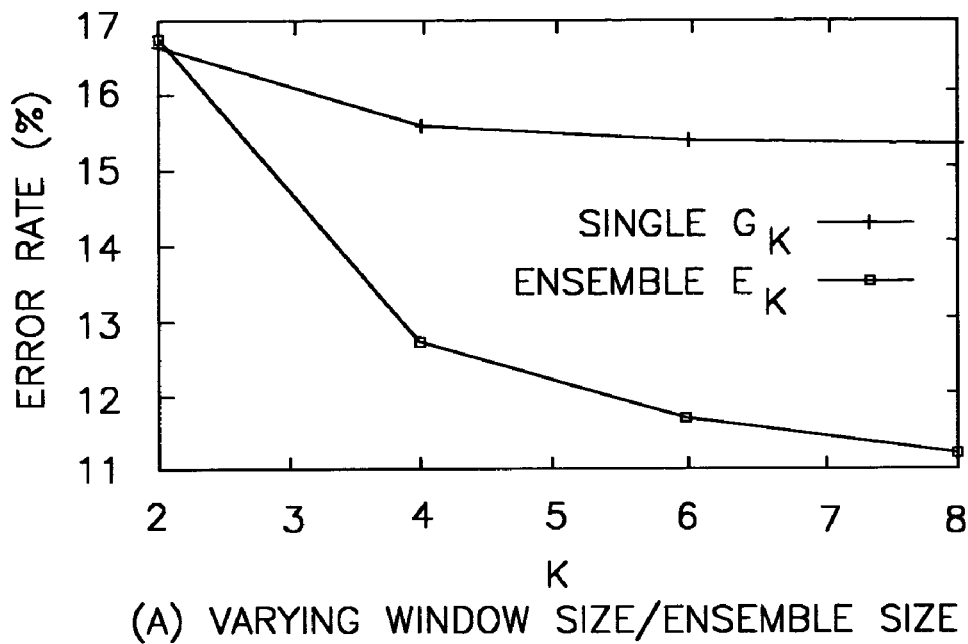
FIGS. 7(a) and 7(b) show average error rate of single and ensemble decision tree classifiers.
Figure 7:
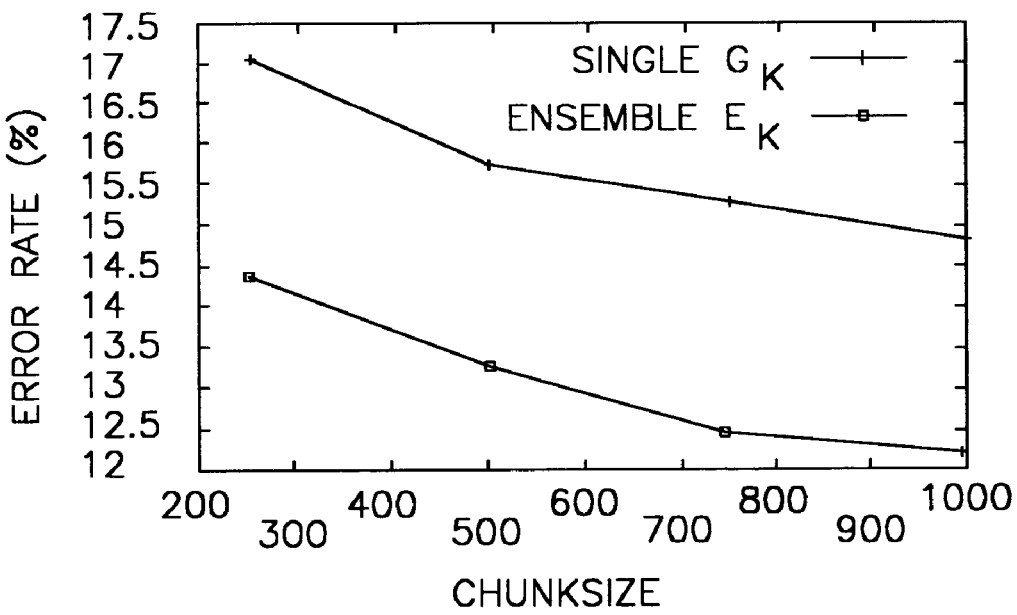

By way of error analysis, we use C4.5 as our base model, and compare the error rates of the single classifier approach and the ensemble approach. The results are shown in FIG. 7 and Table 2. The synthetic datasets used in this study have 10 dimensions (d=10). FIG. 7 shows the averaged outcome of tests on data streams generated with varied concept drifts (the number of dimensions with changing weights ranges from 2 to 8, and the magnitude of the change t ranges from 0.10 to 1.00 for every 1000 records).

First, we study the impact of ensemble size (total number of classifiers in the ensemble) on classification accuracy. Each classifier is trained from a dataset of size ranging from 250 records to 1000 records, and their averaged error rates are shown in FIG. 7(a). Apparently, when the number of classifiers increases, due to the increase of diversity of the ensemble, the error rate of $E_k$ drops significantly. The single classifier, $G_k$, trained from the same amount of the data, has a much higher error rate due to the changing concepts in the data stream. In FIG. 7(b), we vary the chunk size and average the error rates on different K ranging from 2 to 8. It shows that the error rate of the ensemble approach is about 20% lower than the single-classifier approach in all the cases. A detailed comparison between single- and ensemble-classifiers is given in Table 2, where $G_0$ represents the global classifier trained by the entire history data, and we use bold font to indicate the better result of $G_k$ and $E_k$ for K=2, 4, 6, 8.

We also tested the Naive Bayesian and the RIPPER classifier under the same setting. The results are shown in Table 3 and Table 4. Although C4.5, Naive Bayesian, and RIPPER deliver different accuracy rates, they confirmed that, with a reasonable amount of classifiers (K) in the ensemble, the ensemble approach outperforms the single classifier approach.

Figure 8:
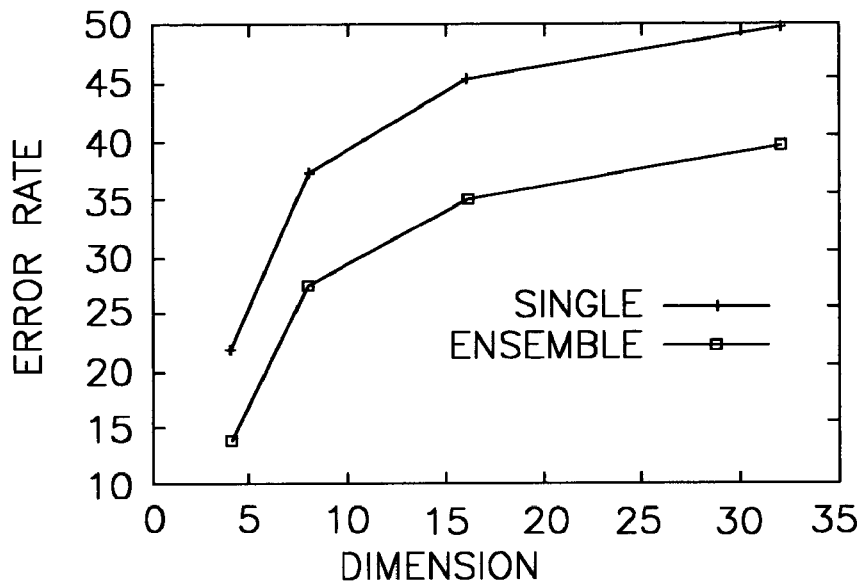
FIGS. 8(a)-(c) show the magnitude of concept drifts.
Figure 8:
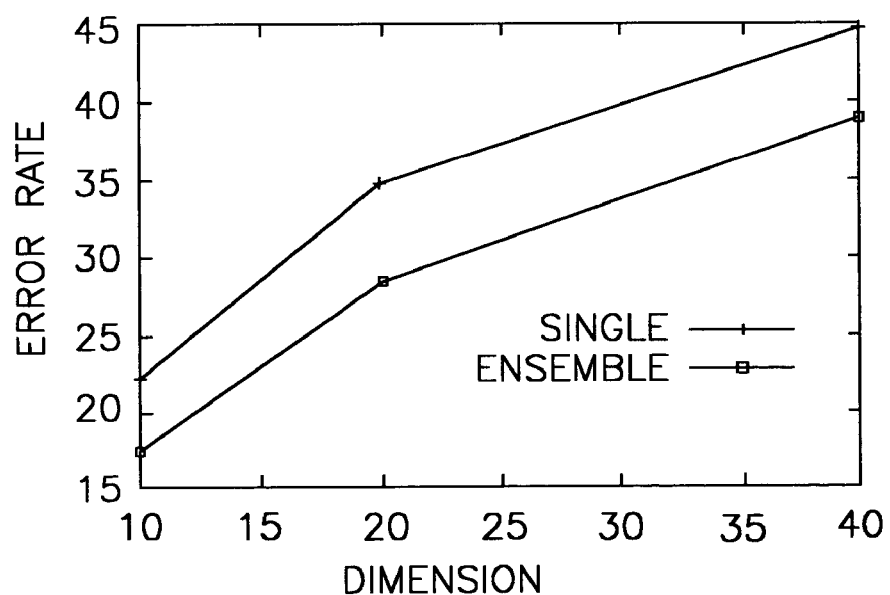
Figure 8:
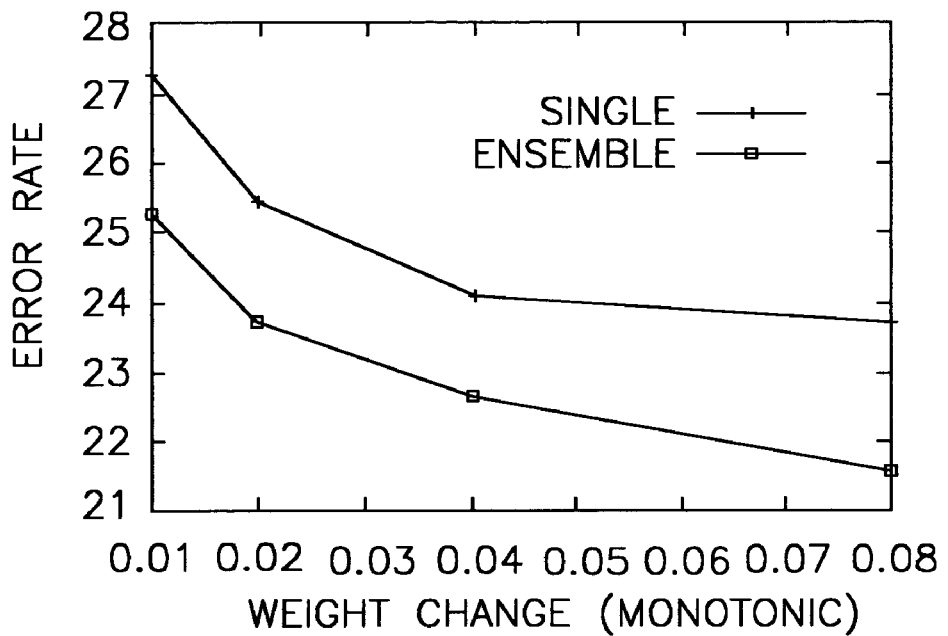

FIG. 8 provides a study of the impact of the magnitude of the concept drifts on classification error. Concept drifts are controlled by two parameters in the synthetic data: i) the number of dimensions whose weights are changing, and ii) the magnitude of weight change per dimension. FIG. 8 shows that the ensemble approach outperform the single-classifier approach under all circumstances. FIG. 8(a) shows the classification error of $G_k$ and $E_k$ (averaged over different K) when 4, 8, 16, and 32 dimensions' weights are changing (the change per dimension is fixed at t=0.10). FIG. 8(b) shows the increase of classification error when the dimensionality of dataset increases. In the datasets, 40% dimensions' weights are changing at ±0.10 per 1000 records. An interesting phenomenon arises when the weights change monotonically (weights of some dimensions are constantly increasing, and others constantly decreasing). In FIG. 8(c), classification error drops when the change rate increases. This is because of the following. Initially, all the weights are in the range of [0, 1]. Monotonic changes cause some attributes to become more and more "important", which makes the model easier to learn.

Figure 9:
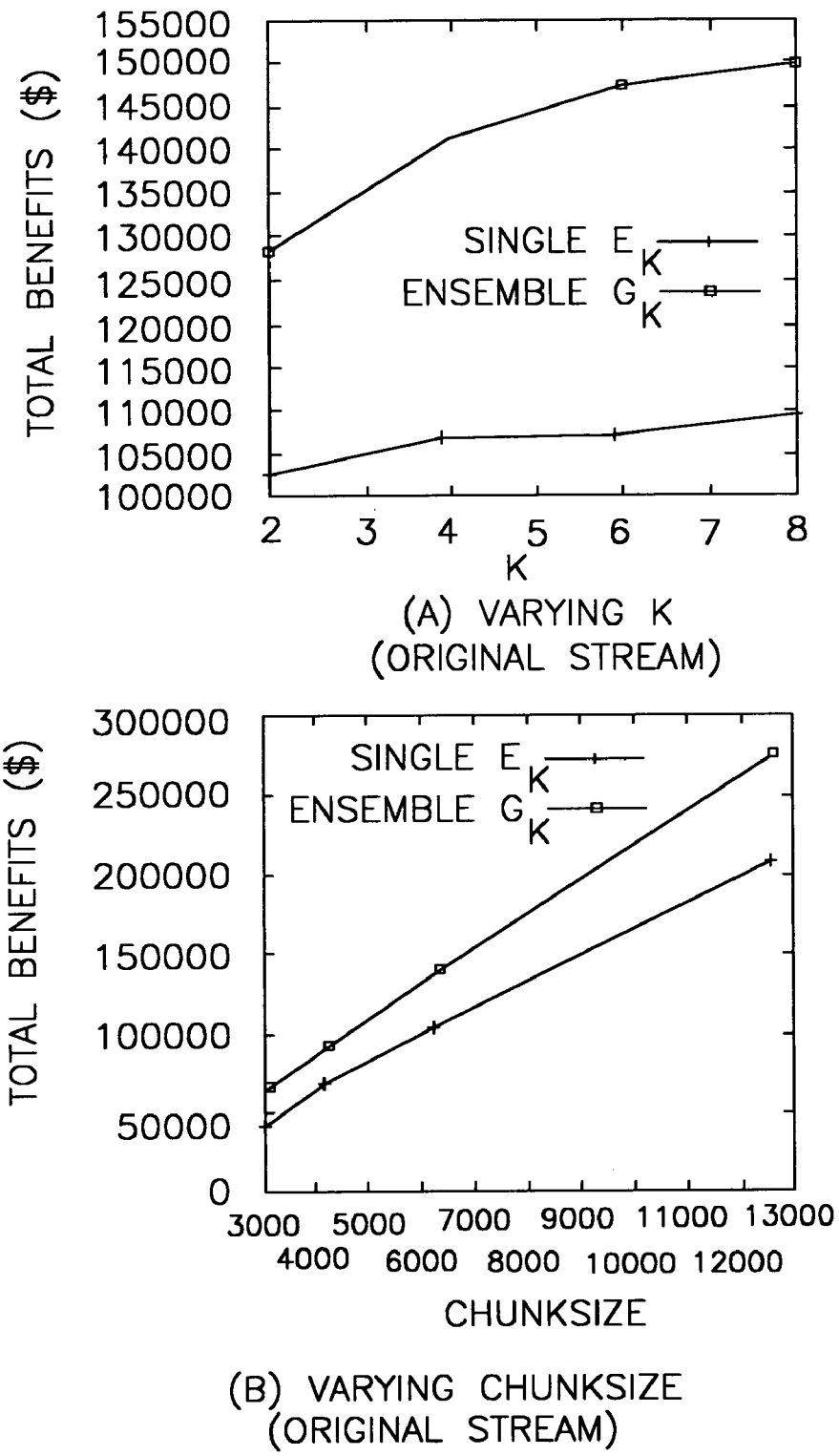
FIGS. 9(a)-(d) show average benefits using single classifiers and classifier ensembles.
Figure 9:
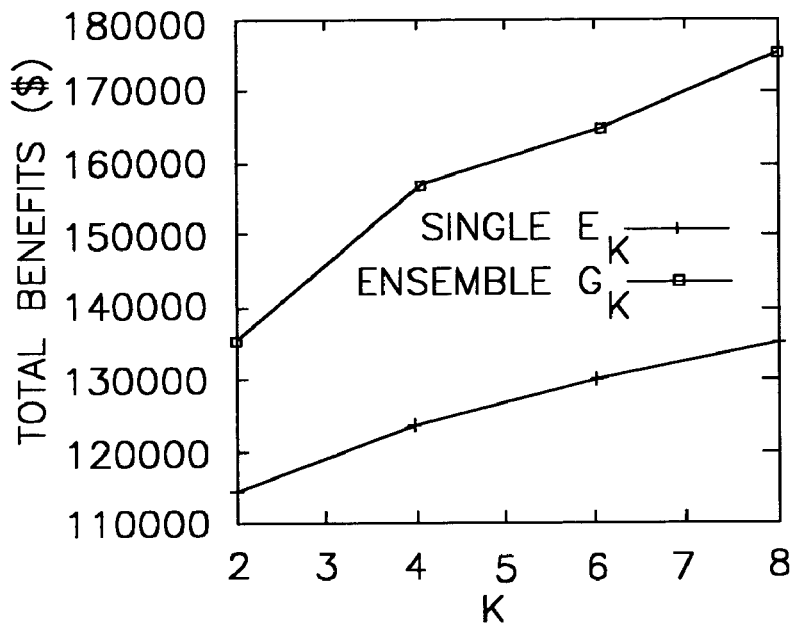
Figure 9:
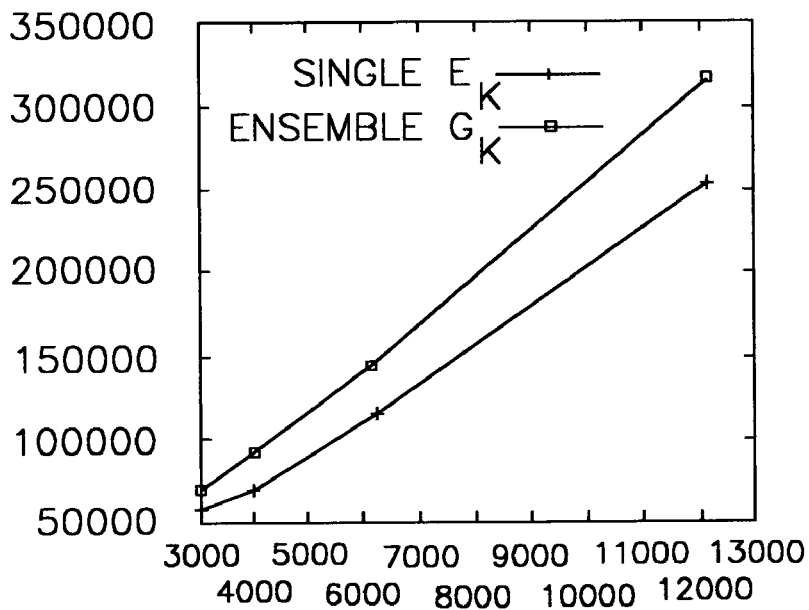

For cost-sensitive applications, we aim at maximizing benefits. In FIG. 9(a), we compare the single classifier approach with the ensemble approach using the credit card transaction stream. The benefits are averaged from multiple runs with different chunk size (ranging from 3000 to 12000 transactions per chunk). Starting from K=2, the advantage of the ensemble approach becomes obvious.

In FIG. 9(b), we average the benefits of $E_k$ and $G_k$ (K=2, . . . ,8) for each fixed chunk size. The benefits increase as the chunk size does, as more fraudulent transactions are discovered in the chunk. Again, the ensemble approach outperforms the single classifier approach.

To study the impact of concept drifts of different magnitude, we derive data streams from the credit card transactions. The simulated stream is obtained by sorting the original 5 million transactions by their transaction amount. We perform the same test on the simulated stream, and the results are shown in FIGS. 9(c) and 9(d).

It is to be understood that the present invention, in accordance with at least one presently preferred embodiment, includes an arrangement for accepting an ensemble of classifiers, an arrangement for training the ensemble of classifiers, and an arrangement for weighting classifiers in the classifier ensembles. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

APPENDIX

TABLE 1

Benefit matrix $b_{c,c'}$

|  | predict fraud | predict ¬fraud |
|---|---|---|
| actual fraud | t($\chi$) − cost | 0 |
| actual ¬fraud | −cost | 0 |

TABLE 2

Error Rate (%) of Single and Ensemble Decision Tree Classifiers

| ChunkSize | $G_0$ | $G_1 = E_1$ | $G_2$ | $E_2$ | $G_4$ | $E_4$ | $G_6$ | $E_6$ | $G_8$ | $E_8$ |
|---|---|---|---|---|---|---|---|---|---|---|
| 250 | 18.09 | 18.76 | 18.00 | 18.37 | 16.70 | 14.02 | 16.72 | 12.82 | 16.76 | 12.19 |
| 500 | 17.65 | 17.59 | 16.39 | 17.16 | 16.19 | 12.91 | 15.32 | 11.74 | 14.97 | 11.25 |
| 750 | 17.18 | 16.47 | 16.29 | 15.77 | 15.07 | 12.09 | 14.97 | 11.19 | 14.86 | 10.84 |
| 1000 | 16.49 | 16.00 | 15.89 | 15.62 | 14.40 | 11.82 | 14.41 | 10.92 | 14.68 | 10.54 |

TABLE 3

Error Rate (%) of Single and Ensemble Naive Bayesian Classifiers

| ChunkSize | $G_0$ | $G_1 = E_1$ | $G_2$ | $E_2$ | $G_4$ | $E_4$ | $G_6$ | $E_6$ | $G_8$ | $E_8$ |
|---|---|---|---|---|---|---|---|---|---|---|
| 250 | 11.94 | 8.09 | 7.91 | 7.48 | 8.04 | 7.35 | 8.42 | 7.49 | 8.70 | 7.55 |
| 500 | 12.11 | 7.51 | 7.61 | 7.14 | 7.94 | 7.17 | 8.34 | 7.33 | 8.69 | 7.50 |
| 750 | 12.07 | 7.22 | 7.52 | 6.99 | 7.87 | 7.09 | 8.41 | 7.28 | 8.69 | 7.45 |
| 1000 | 15.26 | 7.02 | 7.79 | 6.84 | 8.62 | 6.98 | 9.57 | 7.16 | 10.53 | 7.35 |

TABLE 4

Error Rate (%) of Single and Ensemble RIPPER Classifiers

| ChunkSize | $G_0$ | $G_1 = E_1$ | $G_2$ | $E_2$ | $G_4$ | $E_4$ | $G_6$ | $E_6$ | $G_8$ | $E_8$ |
|---|---|---|---|---|---|---|---|---|---|---|
| 50  | 27.05 | 24.05 | 22.85 | 22.51 | 21.55 | 19.34 | 24.05 | 22.51 | 19.34 | 17.84 |
| 100 | 25.09 | 21.97 | 19.85 | 20.66 | 17.48 | 17.50 | 21.97 | 20.66 | 17.50 | 15.91 |
| 150 | 24.19 | 20.39 | 18.28 | 19.11 | 17.22 | 16.39 | 20.39 | 19.11 | 16.39 | 15.03 |

TABLE 5

Benefits (U.S. $) using Single Classifiers and Classifier Ensembles (simulated stream)

| ChunkSize | $G_0$ | $G_1 = E_1$ | $G_2$ | $E_2$ | $G_4$ | $E_4$ | $G_6$ | $E_6$ | $G_8$ | $E_8$ |
|---|---|---|---|---|---|---|---|---|---|---|
| 12000 | 296144 | 207392 | 233098 | 268838 | 248783 | 313936 | 263400 | 327331 | 275707 | 360486 |
| 6000  | 146848 | 102099 | 102330 | 129917 | 113810 | 148818 | 118915 | 155814 | 123170 | 162381 |
| 4000  | 96879  | 62181  | 66581  | 82663  | 72402  | 95792  | 74589  | 101930 | 76079  | 103501 |
| 3000  | 65470  | 51943  | 55788  | 61793  | 59344  | 70403  | 62344  | 74661  | 66184  | 77735  |

TABLE 6

Benefits (U.S. $) using Single Classifiers and Classifier Ensembles (original stream)

| ChunkSize | $G_0$ | $G_1 = E_1$ | $G_2$ | $E_2$ | $G_4$ | $E_4$ | $G_6$ | $E_6$ | $G_8$ | $E_8$ |
|---|---|---|---|---|---|---|---|---|---|---|
| 12000 | 201717 | 203211 | 197946 | 253473 | 211768 | 269290 | 211644 | 282070 | 215692 | 289129 |
| 6000  | 103763 | 98777  | 101176 | 121057 | 102447 | 138565 | 103011 | 143644 | 106576 | 143620 |
| 4000  | 69447  | 65024  | 68081  | 80996  | 69346  | 90815  | 69984  | 94400  | 70325  | 96153  |
| 3000  | 43312  | 41212  | 42917  | 59293  | 44977  | 67222  | 45130  | 70802  | 46139  | 71660  |

APPENDIX

Algorithm 1: A classifier ensemble approach for mining concept-drifting data streams Input: S: a dataset of ChunkSize from the incoming stream
K: the total number of classifiers
C: a set of K previously trained classifiers
Output: C: a set of K classifiers with updated weights
train classifier C' from S;
compute error rate/benefits of C' via cross validation on S;
derive weight w' for $C^i$ using (8) or (9);
for each classifier $C_i \in C$ do
  apply $C_i$ on S to derive $MSE_i$ or $b_i$;
  compute $w_i$ based on (8) and (9);
C ← K of the top weighted classifiers in C ∪ {C'};
return C;

Algorithm 2: obtaining $\mu_{k,i}$ and $\sigma_{k,i}$ during emsemble construction Input: S: a dataset of ChunkSize from the incoming stream
K: the total number of classifiers
ξ: number of bins
C: a set of K previously trained classifiers
Output: C: a set of K classifiers with updated weights
μ, σ: mean and variance for each stage and each bin
train classifier C' from S;
compute error rate/benefits of C' via cross validation on S;
derive weight w' for C' using (8) or (9);
for each classifier $C_k \in C$ do
  apply $C_k$ on S to derive $MSE_k$ or $b_k$;
  compute $w_k$ based on (8) and (9);
C ← K of the top weighted classifiers in C ∪ {C'};
for each y ∈ S do
  compute $F_k(y)$ for k = 1, ..., K;
  y belongs to bin (i, k) if $F_k(y) \in \left[\frac{i}{\xi}, \frac{i+1}{\xi}\right)$;
  incrementally updates $\mu_{i,k}$ and $\sigma_{i,k}$ for bin (i, k);

APPENDIX-continued

Algorithm 3: Classification with Instance Based Pruning

Input: y: a test example
t: confidence level
C: a set of K previously trained classifiers
Output: prediction of y's class Let C = {$C_1$, ..., $C_n$} with $w_i \geq w_j$ for i < j;
$F_0(y) \leftarrow 0$;
w ← 0;
for k = {1, ..., K} do
  $F_k(y) \leftarrow \frac{F_{k-1} \cdot w + w_k \cdot p_k(fraud/x)}{w + w_k}$;
  w ← w + $w_k$;
  let i be the bin y belongs to;
  apply rules in (10) to check if y is in t-σ region;
  return fraud/non-fraud if t-σ confidence is reached;
if $F_K(y) >$ cost/t(y) then
  return fraud;
else
  return non-fraud;

What is claimed is:

1. An apparatus for mining concept-drifting data streams, said apparatus comprising:
a processor;
an arrangement for accepting an ensemble of classifiers;
an arrangement for training the ensemble of classifiers from data in a data stream; and
an arrangement for weighting classifiers in the classifier ensembles, wherein said weighting arrangement is adapted to weight classifiers based on an expected prediction accuracy with regard to current data, and to apply a weight to each classifier such that the weight is inversely proportional to an expected prediction error of the classifier with regard to a current group of data;

wherein the weighted classifiers are stored in a computer memory.

2. The apparatus according to claim 1, wherein said arrangement for training the ensemble of classifiers from data in a data stream is adapted to train the ensemble of classifiers from groups of sequential data in a data stream.

3. The apparatus according to claim 1, further comprising an arrangement for pruning a classifier ensemble.

4. The apparatus according to claim 3, wherein the pruning arrangement is adapted to apply an instance-based pruning technique to data streams with conceptual drifts.

5. A computer implemented method for mining concept-drifting data streams, said method comprising the steps of:

accepting an ensemble of classifiers;

training the ensemble of classifiers from data in a data stream; and weighting classifiers in the classifier ensembles, wherein said weighting step comprises weighting classifiers based on an expected prediction accuracy with regard to current data, and applying a weight to each classifier such that the weight is inversely proportional to an expected prediction error of the classifier with regard to a current group of data;

wherein the weighted classifiers are stored in a computer memory.

6. The method according to claim 5, wherein said step of training the ensemble of classifiers from data in a data stream comprises training the ensemble of classifiers from groups of sequential data in a data stream.

7. The method according to claim 5, further comprising the step of pruning a classifier ensemble.

8. The method according to claim 7, wherein said pruning step comprises applying an instance-based pruning technique to data streams with conceptual drifts.

9. A program storage device readable by machine, tangibly embodying a program of instructions executable by the machine to perform method steps for mining concept-drifting data streams, said method comprising the steps of:

accepting an ensemble of classifiers;

training the ensemble of classifiers from data in a data stream; and weighting classifiers in the classifier ensembles, wherein said weighting step comprises weighting classifiers based on an expected prediction accuracy with regard to current data, and applying a weight to each classifier such that the weight is inversely proportional to an expected prediction error of the classifier with regard to a current group of data;

wherein the weighted classifiers are stored in memory readable by the machine.

* * * * *